March 5, 1940. J. H. FRIDÉN Re. 21,378

EXTRUSION PRESS Orig. 2,023,879

Original Filed Jan. 9, 1933 11 Sheets-Sheet 1

INVENTOR-
John H. Fridén
BY
H. C. Klisering
HIS ATTORNEY-

March 5, 1940. J. H. FRIDÉN Re. 21,378

EXTRUSION PRESS

Original Filed Jan. 9, 1933 11 Sheets-Sheet 2

March 5, 1940. J. H. FRIDÉN Re. 21,378

EXTRUSION PRESS

Original Filed Jan. 9, 1933 11 Sheets-Sheet 3

INVENTOR-
John H. Fridén
BY
H. C. Wiesend
HIS ATTORNEY-

March 5, 1940. J. H. FRIDÉN Re. 21,378

EXTRUSION PRESS

Original Filed Jan. 9, 1933 11 Sheets-Sheet 4

INVENTOR-
John H. Fridén
BY
H. C. Lisenud
HIS ATTORNEY-

March 5, 1940. J. H. FRIDÉN Re. 21,378

EXTRUSION PRESS

Original Filed Jan. 9, 1933 11 Sheets-Sheet 5

INVENTOR-
John H. Fridén
BY
H. C. Clausing
HIS ATTORNEY-

March 5, 1940. J. H. FRIDÉN Re. 21,378
EXTRUSION PRESS
Original Filed Jan. 9, 1933 11 Sheets-Sheet 6
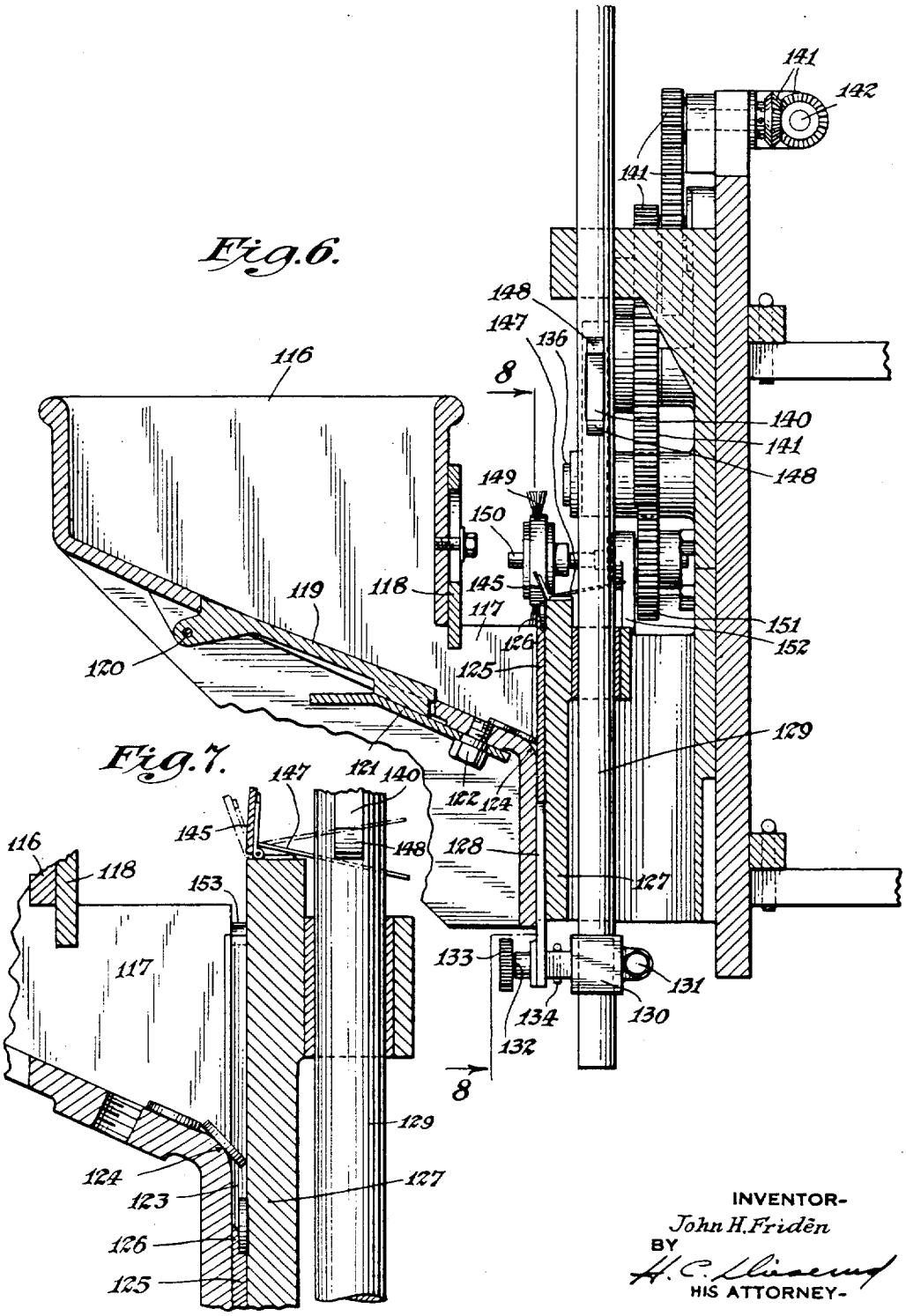
INVENTOR-
John H. Fridén
BY
H. C. Lisseman
HIS ATTORNEY- March 5, 1940. J. H. FRIDÉN Re. 21,378

EXTRUSION PRESS

Original Filed Jan. 9, 1933 11 Sheets-Sheet 7

INVENTOR-
John H. Fridén
BY
H. C. Mussing
HIS ATTORNEY-

March 5, 1940. J. H. FRIDÉN Re. 21,378
EXTRUSION PRESS
Original Filed Jan. 9, 1933 11 Sheets-Sheet 8
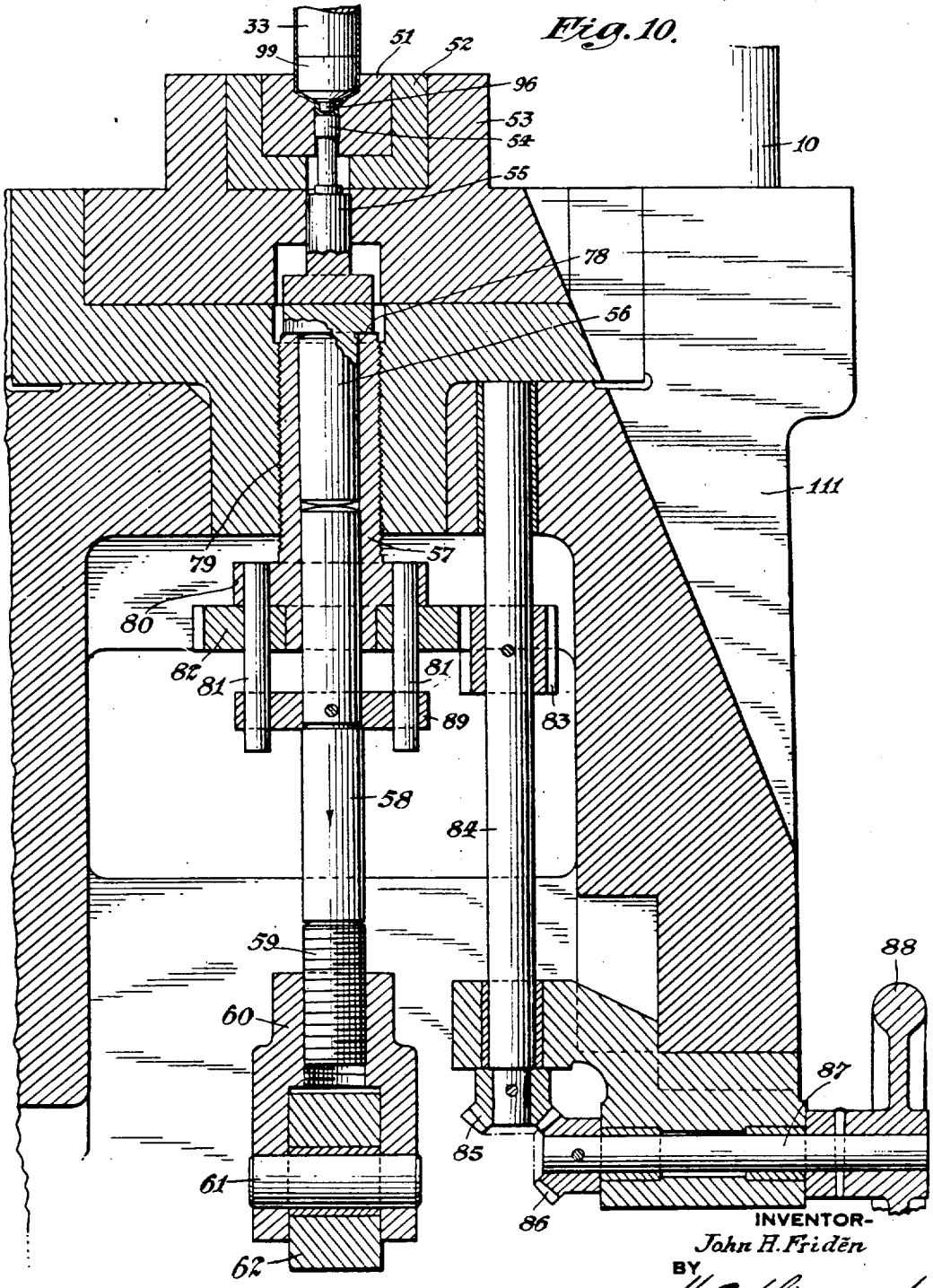
INVENTOR-
John H. Fridén
BY
H. C. Lisenard
HIS ATTORNEY- March 5, 1940. J. H. FRIDÉN Re. 21,378

EXTRUSION PRESS

Original Filed Jan. 9, 1933 11 Sheets-Sheet 9

INVENTOR
John H. Fridén
BY
H. C. Mieseund
HIS ATTORNEY

March 5, 1940. J. H. FRIDÉN Re. 21,378
EXTRUSION PRESS
Original Filed Jan. 9, 1933 11 Sheets-Sheet 10
Fig. 14.
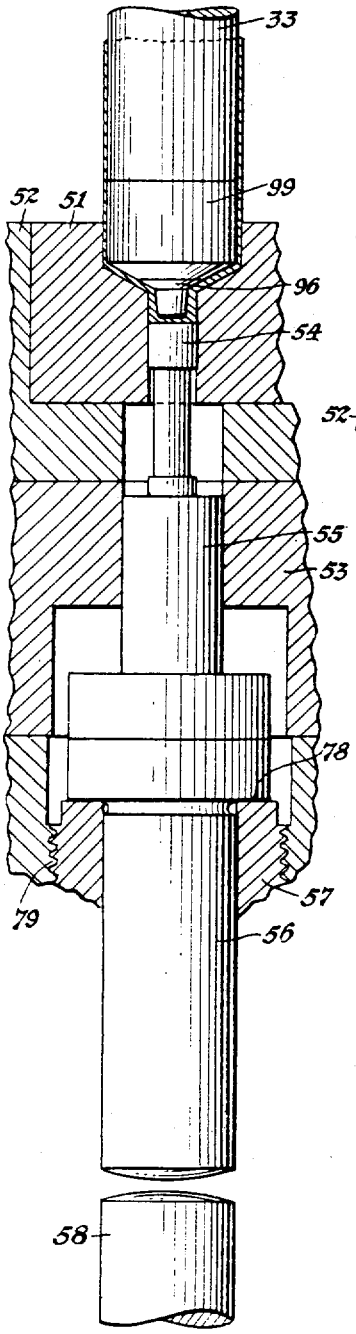
Fig. 15.
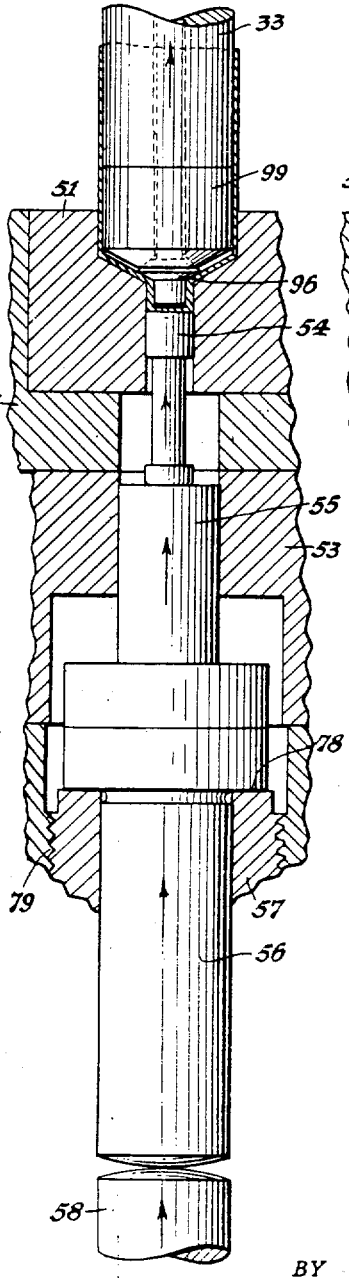
Fig. 16.
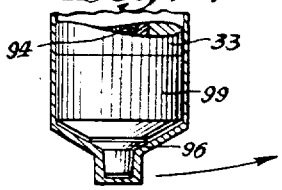
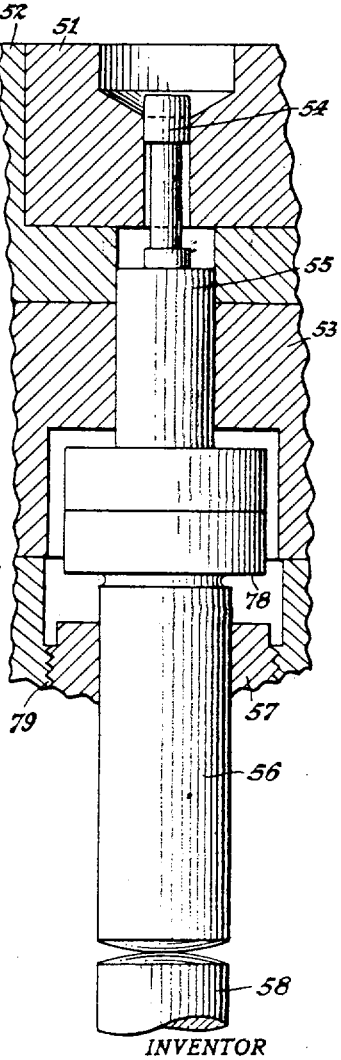
INVENTOR
John H. Fridén
BY
H. C. Wiseman
HIS ATTORNEY

EXTRUSION PRESS

Original Filed Jan. 9, 1933 11 Sheets-Sheet 11

INVENTOR
John H. Fridén
BY H. C. Klausing
HIS ATTORNEY

Reissued Mar. 5, 1940

Re. 21,378

UNITED STATES PATENT OFFICE 21,378

EXTRUSION PRESS

John H. Fridén, Maplewood, N. J., assignor to The Sun Tube Corporation, Hillside, N. J., a corporation of New Jersey Original No. 2,023,879, dated December 10, 1935, Serial No. 650,850, January 9, 1933. Application for reissue August 18, 1939, Serial No. 290,845

30 Claims. (Cl. 207—9)

This invention relates to improvements in extrusion presses by which tubular members or the like may be extruded from metal or similar material in an efficient and economical manner. It is particularly suited to the production of tubes of the type now commonly employed in the packaging of tooth paste and similar creamy or pasty material or jellied substances.

An important feature of the invention is the elimination of heavy reciprocating parts and the provision of improved feeding, pressure producing, and ejecting mechanisms which enable more rapid operation of the press. These mechanisms are so constructed and coordinated that a greater portion of the operating cycle of the machine is available for the extrusion of the tube. This enables the speeding up of the operation as a whole since it is the time required for extrusion that is the limiting factor in the speed of operation of the machine. If an attempt is made to apply the pressure too rapidly to the slug from which the tube is extruded there will be a tendency to produce irregularities in the tube due to the fact that the metal will not flow uniformly at high speeds. Furthermore, greater power is required to produce the rapid flow of the metal and a more sturdy and expensive construction would be necessitated.

By the present improvements, however, a desirable extrusion period is permitted even though the machine as a whole is speeded up to a rate considerably above the maximum of machines heretofore employed for the purpose. In the specific, illustrative form of machine disclosed in the present case an extrusion period occupying 66° of the cycle is brought about, whereas in prior machines it has been possible to employ only about 20° of the cycle for extrusion purposes. An ordinary tooth paste tube about six inches long may be extruded from a slug of tin in a certain fraction of a second without danger of producing defects. This means that prior machines may be operated at only a limited R. P. M. while machines embodying the present improvements may be safely operated at a considerably greater R. P. M.

The nature of the improvements and the interrelation between the various portions of the machine may be more readily understood from a brief outline of an illustrative construction. The machine is provided with a sturdy frame of suitable form which may be considerably lighter than the frames of prior machines intended for the same duty. Various operating connections are provided from a power source, as from a pulley adapted to be driven from a line shaft, to the several moving parts of the machine. An eccentric carried by the main shaft operates a toggle to one arm of which is connected the punch forming the male member of the press. During the initial downward movement of the punch it is rocked from an outwardly angled position to a strictly vertical position. Its point is then presented directly over a circular slug of tin or similar metal held within a female die. Continued downward movement of the punch sets up the necessary pressure to cause the metal to form a tube having a thin wall surrounding the punch.

Special provision is made for avoiding the puncturing of the portion of the metal forming the end of the tube. This will be explained in detail later. As the punch is withdrawn from the die, a valve at the end of the punch is opened by a slight relative movement between the tube and the main body of the punch. Subsequently the tube is knocked free from the die so that the tube and punch will then be lifted together. After the punch has been completely disengaged from the die the punch is rocked outwardly through an angle of about 30° to its original position. As the punch approaches its original position a second valve is opened up and air, or some other suitable gaseous medium, is forced through the punch into the closed end of the tube, with the result that the latter is blown off the punch. If desired, the gaseous medium employed may be a suitable cleaning gas for removing any slight oil film which may be present on the interior surface of the tube. To avoid damaging the rather fragile tube it is thrown against a padded arm which is moved in the same direction as the tube, but at a slightly slower speed, at the time that it is struck by the tube. The extruded tube is then deposited on a conveyor and transported to the next stage in its manufacture into a finished article.

The cycle just explained is continuously repeated, each tube requiring but a single rotation of the main shaft. An effective feeding means is provided for introducing a new slug into the die upon each cycle of operation. A hopper of improved construction is adapted to retain a large supply of slugs and suitable mechanism, requiring a minimum amount of power, serves to transfer the slugs to the feeding means. This mechanism is efficient, reliable and positive in its action so that the presence of a slug in the die as the punch is brought into it is substantially assured.

The machine is made exceedingly flexible, by the provisions for adjustment of the various portions, so that it may be readily adapted for the extrusion of tubes of different sizes and may be adjusted to compensate for wear of the parts.

With this general outline of the construction and operation of a machine embodying the various features of the invention a detailed description of this illustrative machine will now be given in conjunction with the accompanying drawings in which:

Figure 6 is a vertical section through the hopper and associated portion of the machine taken along the line 6—6 of Figure 3.

Figure 7 is an enlarged view of a portion of Figure 6 showing certain operating parts in a shifted position.

Figure 10 is an enlarged vertical section taken along the same line as Figure 4 but showing only a portion of the mechanism and in greater detail, the parts being shifted.

Figures 12, 13, 14, 15 and 16 are detail views in central section through the die showing the punch and other parts in elevation, the various views disclosing the relation of the parts at various stages in a cycle of operation.

*Punch construction and operating mechanism*

Figure 1:
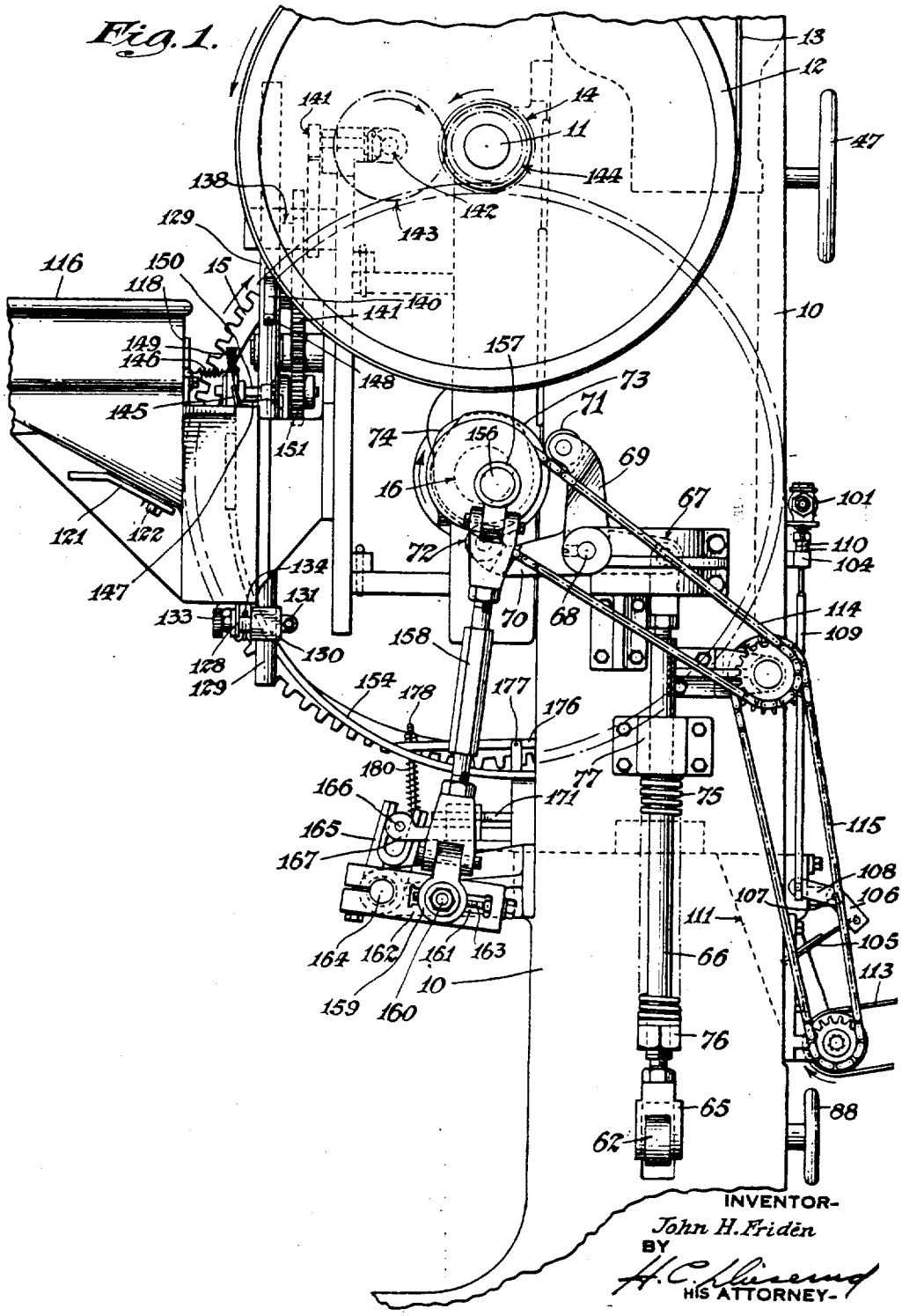
Figure 1 is a side elevation of a machine embodying the invention.
Figure 2:
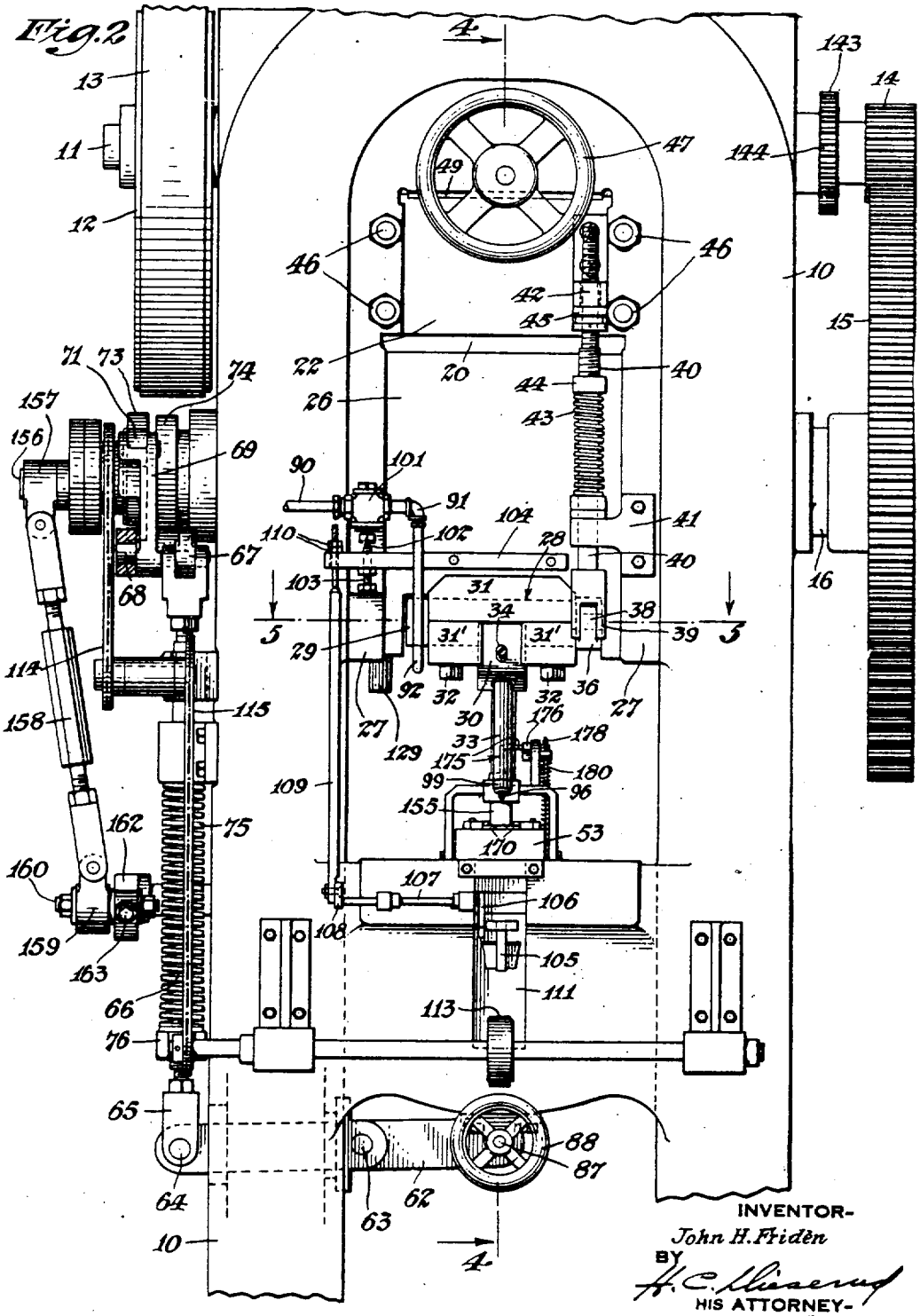
Figure 2 is a front elevation of the machine.
Figure 3:
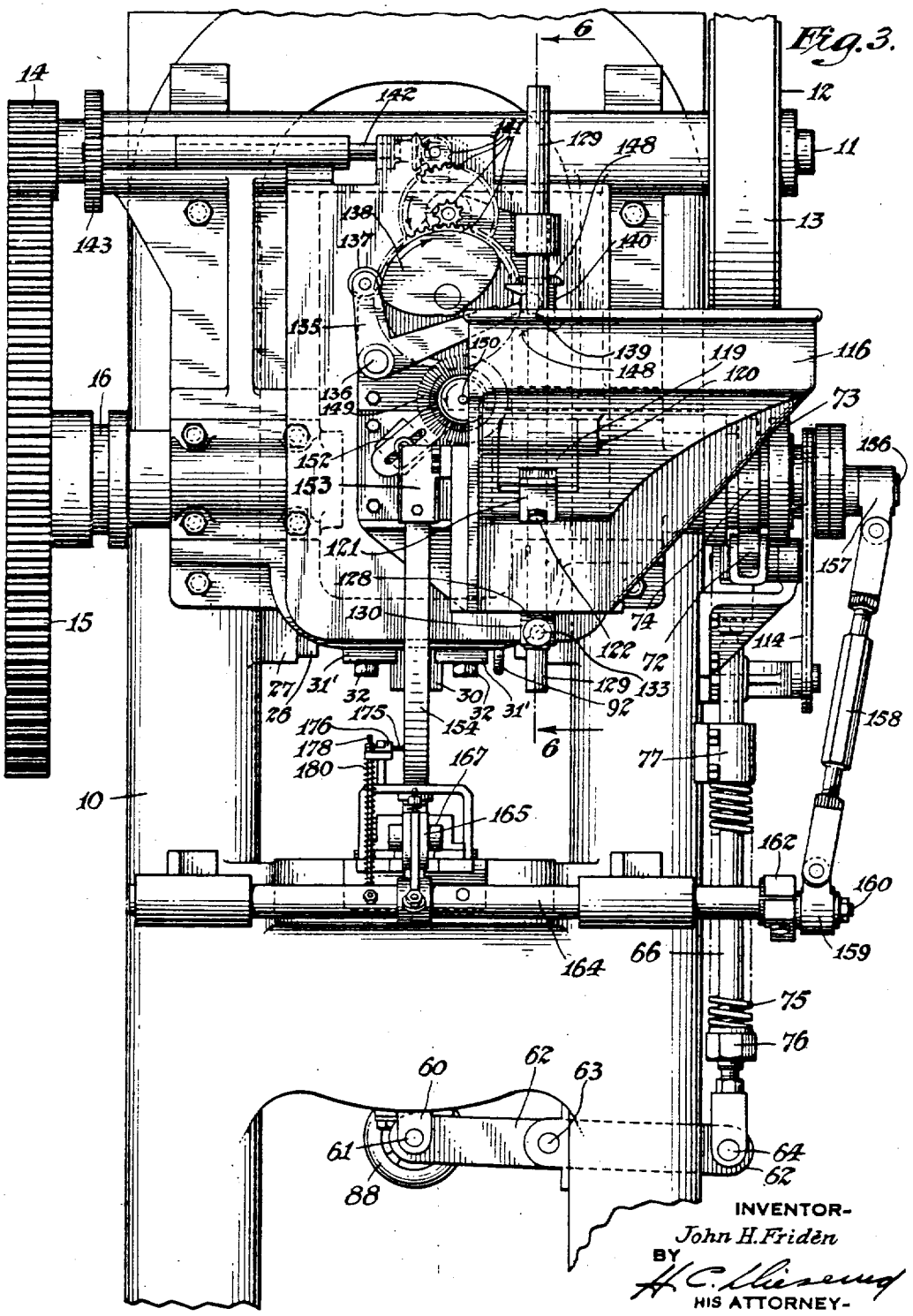
Figure 3 is a rear elevation of the machine.

Referring now to Figures 1, 2, 4 and 5, the machine embodying the improvements of the present invention may comprise a main frame 10 of any suitable form and sufficiently sturdy to withstand the rather hard usage of a punch press. It need not, however, be of as heavy construction as is commonly employed in machines of this type due to the fact the elimination of heavy reciprocating parts has, at the same time, eliminated a large portion of the strain. Near the top of the frame there is horizontally disposed a shaft 11 which extends across the frame and at one end carries a pulley 12. This pulley is adapted to derive power from a belt 13 connected in any convenient way with a line shaft or other source of power. If desired, the shaft 11 might be driven directly through suitable reduction gearing by an electric motor or other similar source of power. At the opposite end of the shaft 11 there is secured a small pinion 14 which meshes with a relatively large gear 15 carried by a shaft 16. About half way between the sides of the frame the shaft 16 is provided with an eccentric portion 17 which receives the lower end of a connecting rod 18. At its upper end the connecting rod is pivotally attached to a rockable frame 20 pivotally connected at 21 to a block 22 carried by the main frame 10. The rockable frame 20 forms one arm of a toggle. It is connected by a toggle joint 23 to a heavy link 24 pivotally attached at 25 to a slidable head 26. The head 26 is mounted for vertical movement between guides 27 integral with or otherwise secured to the frame 10.

At the lower end of the sliding head there is mounted a T-shaped punch holder 28 having a pair of laterally extending trunnions 29 and a downwardly extending portion 30 at its center. The trunnions 29 are firmly held upon the head 26 by means of a block 31 suitably connected with the head and having caps 31′ secured to the block by a series of bolts 32. The downwardly extending portion 30 of the member 28 is provided with an opening adapted to receive the upper end of a punch 33 which is held securely in place by means of a setscrew 34. This construction is such that the punch may be readily replaced, whenever desired, by a punch of different size or by a new punch of the same type. At the end of one of the trunnions 29 there is formed a series of gear teeth 35 adapted to mesh with the teeth of a segment 36 pivotally supported at 37 upon the head 26. The gear segment has an outwardly extending arm 38 pivotally connected with a forked portion 39 of a vertically disposed rod 40. This rod is retained and guided for vertical movement by means of a bracket 41, secured to the main frame, and a bracket 42 secured to the block 22. A spring 43 surrounding the rod is confined between the bracket 41 and a collar 44 adjustably carried by the rod. It will be apparent that the spring 43 normally urges the rod upwardly until a collar 45 adjustably mounted on the rod is brought into engagement with the bracket 42. The collars 44 and 45 have screw-threaded engagement with the rod and are independently adjustable. By proper adjustment of the collar 44, the tension of the spring 43 may be varied while adjustment of the collar 45 will permit variation in the upward movement of the rod 40.

The operation of the punch is as follows: Upon rotation of the shaft 16, the crank portion 17 will draw the connecting rod 18 downwardly, thereby rocking the frame 20 and straightening the toggle. This will cause a downward movement of the head 26. During the first portion of the downward movement the rod 40 will remain stationary. This is due to the fact that the spring 43 will act to hold the collar 45 against the bracket 42. Therefore, the end of the arm 38 will be held stationary while the pivot 37 of the segment will be shifted downwardly with the head. This will cause the punch holder to rotate until the punch 33 is vertically disposed. At this time further rotation of the trunnions 29 will be prevented by the engagement of the downwardly extending portion of the holder with a surface on the caps 31′. Continued downward movement of the head, therefore, will cause the rod 40 to be shifted downwardly, thereby compressing the spring 43 still further. Upon the return movement of the head the punch 33 will be held vertically disposed by the spring 43 until the collar 45 engages the bracket 42. This will arrest the upward movement of the point of pivotal connection between the arm 38 and the rod 40. The pivot 37 of the segment 36 will, however, continue its upward movement and will, therefore, rotate the punch holder 28 into the position shown in Figure 4.

In order to provide for adjustment of the head 26, to vary the upper and lower limits of the travel of the punch, the block 22 may be adjusted upwardly or downwardly, as desired. For this purpose it is simply necessary to loosen clamping bolts 46 which clamp the block 22 to the main frame and then turn a handwheel 47. This handwheel is connected with a shaft having a screw-threaded portion 48 at its inner end cooperating with an upward extension of a wedge member 49. By turning the handwheel 47 the wedge may be forced into or moved outwardly from the tapered space between the frame 10 and the top of the block 22. When the block has been properly adjusted, the bolts 46 may again be tightened.

*Die and knockout pin construction*

Figure 12:
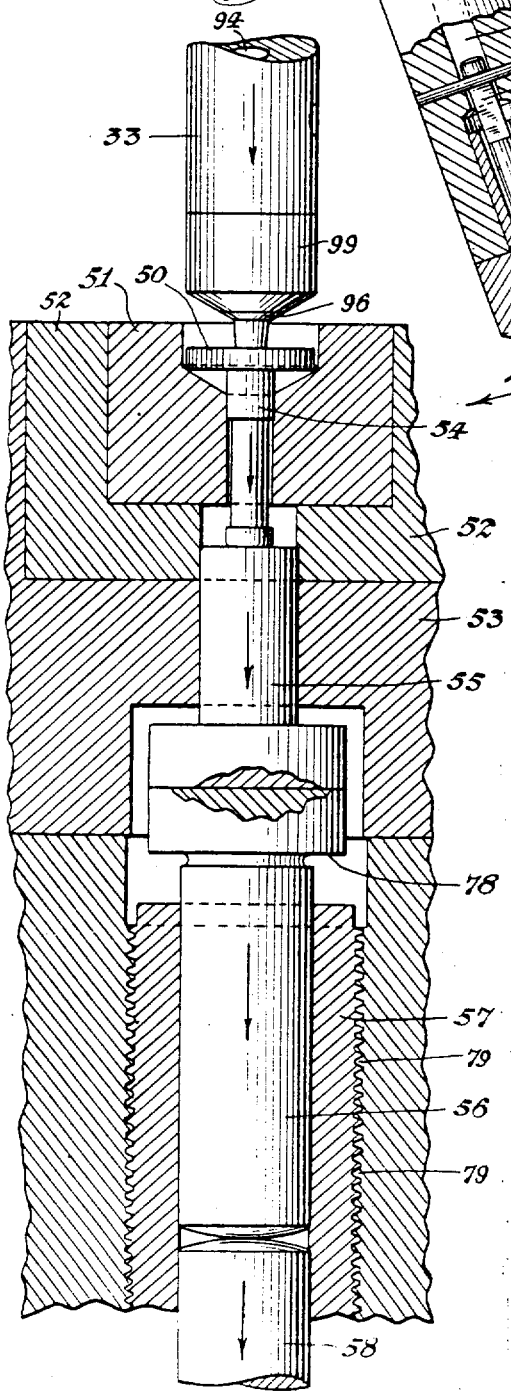
Figure 11:
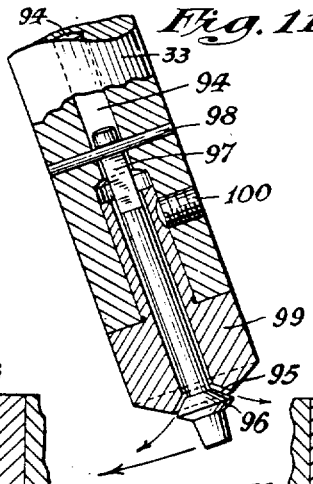
Figure 11 is a detail view showing the end of the punch largely in longitudinal section.
Figure 13:
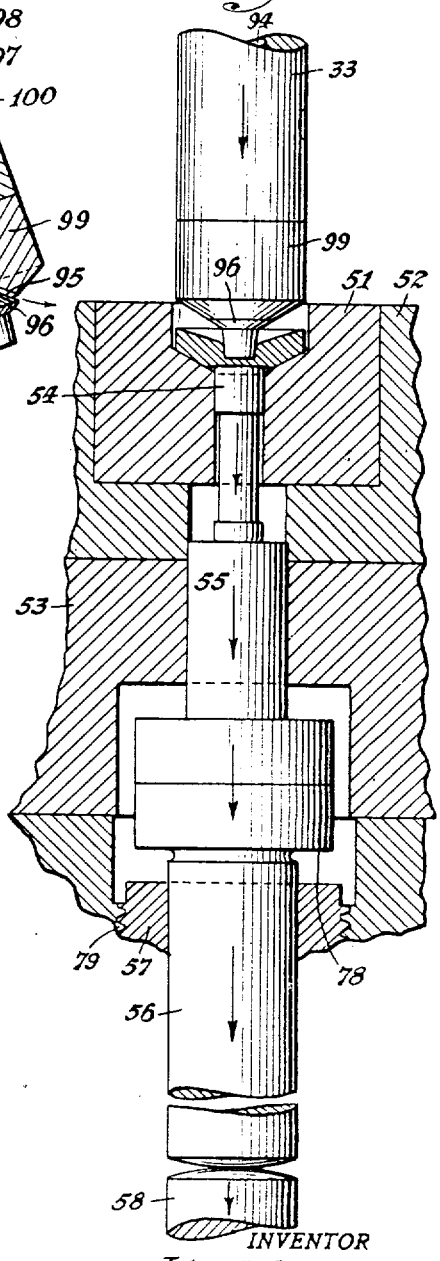
Figure 17:
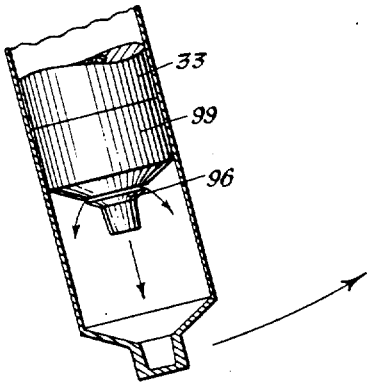
Figure 17 is a detail view disclosing the end of the punch and the extruded tube, the tube being shown as partly separated from the punch.

Referring now particularly to Figure 12, it will be noted that when the punch 33 is moved downwardly after it has been rocked into vertical position, it is forced against the center of a slug 50 which has been previously deposited, as will later be explained, in a recess in a die 51. This die is carried by a die-holder 52 mounted within a cup-shaped portion of a block 53 (Figure 4) secured in any suitable way to the body of the machine. Directly in line with the nose of the punch 33 there is provided in a recess in the die 51 a slidable pin 54 which may be designated a knockout pin. This pin supports the central portion of the slug 50 at the time the punch is brought into engagement with the slug. The pin in turn is supported by a slidable member or rod formed into two sections, the upper section extending upwardly through an opening in the block 53. The lower section 56 of this member is guided for vertical movement by the wall of an opening in a sleeve 57. The lower end of the section 56 rests upon the upper end of a rod 58, which may be designated a knockout rod. This rod is also slidably mounted in the opening in the sleeve 57. At its lower end (Figures 4 and 10) it carries a screwthreaded portion 59 engaged with a socket formed at the upper end of a forked member 60, which is pivotally connected at 61 with a lever 62. The latter is pivoted at about its mid point, as at 63, upon a bracket secured to the main frame. At its opposite end the lever is pivotally connected at 64 to a yoke 65 secured to the lower end of a vertically disposed rod 66. This rod (Figure 1) at its upper end is pivotally connected to an arm 67 secured to a rockable shaft or stud 68. A pair of arms 69 and 70 is also secured to this shaft, these arms carrying rollers 71 and 72, respectively, cooperating with a pair of cams 73 and 74. These cams are substantially complemental so as to positively rock the shaft or stud 68 in both directions and consequently raise and lower the rod 66. The arrangement and form of the cams is such, however, that at times the rod 66 may be moved under the control of means other than the cams. For example the roller 71 is adapted to drop off of the high part of the cam 73 somewhat before a rise in the cam 74 engages the roller 72 to positively rock the arm 70. It is at this time that the punch engages the slug and transmits its force to the pin 54 which in turn causes the rod 66 to be lifted through the action of the lever 62. Upward movement of the rod 66 will be yieldingly resisted at this time by means of a spring 75. This spring surrounds the rod and abuts at one end against an adjustable nut 76, at the lower end of the rod, and at its upper end against a bracket 77 secured to the main frame. The spring 75 will tend to maintain the roller 72 in engagement with the cam 74 but its action will be overcome by the force applied by the punch. Subsequently a high point on the cam 74 is brought opposite roller 72 to hold the rod 66 elevated, independently of the force received from the punch. The construction is such, therefore, that the pin 54 will lend some support to the central portion of the slug 50 as the downward pressure of the punch is applied but this support will be a yielding one depending upon the strength of the spring 75. The provision of this yielding or retreating support by means of the pin 54 is quite important, as without it there is danger that the punch will completely pierce the center of the slug and thus interfere with the removal of the extruded tube in the manner to be explained. When the pin 54 has receded to just the proper extent into the recess in the die 51, a shoulder 78 on the intermediate member 55 will engage the upper end of the sleeve 57. This, then, will determine the final extent of separation between the nose of the punch and the bottom of the die, formed by the upper end of the pin 54. The timing of the cams 73 and 74 is such that the pin 54 will be placed under the yielding resistance of spring 75 before the punch engages the slug, regardless of the particular adjustment of the block 22 by wheel 47. It will be apparent that cam 74 will prevent the pin 54 from rising too far in the die under the action of spring 75. As will be explained later, the pin 54 in addition to providing a yielding support, in the manner explained, serves to aid in properly removing the tube from the die by the operation of the cams 73 and 74.

In Figure 10 there is shown in detail means for adjusting the sleeve 57 so as to vary the extent of downward movement of the pin before the shoulder 78 engages the upper end of the sleeve. For this purpose the sleeve is provided with external screw threads in engagement with threads 79 carried by a portion of the bed of the machine. The lower end of the sleeve 57 has an enlarged portion 80 carrying a series of pins 81, two or more as desired, which pass through corresponding openings in a gear 82 mounted upon the lower end of the sleeve 57. The gear 82 meshes with a pinion 83 secured to a shaft 84 having suitable bearings in the main frame and carrying a bevelled pinion 85 at its lower end. This in turn meshes with the bevelled pinion 86 at the inner end of a shaft 87 which carries a handwheel 88 at its outer end. It will be apparent that upon rotation of the handwheel the gear 82 and sleeve 57 will be rotated.

By virtue of the screw threads on this sleeve it will be either elevated or lowered, as desired, according to the direction of rotation. Pinion 83 is provided with a broad face so as to permit the desired relative sliding movement between this pinion and the gear 82. In order that the rod 58 may be adjusted at the same time with relation to the lever 62, a disc 89 is secured to the rod and is provided with openings adapted to register with the pins 81. Relative sliding movement is permitted between the disc and pins but it will be apparent that the disc as well as the rod 58 will be rotated with the gear 82. The threaded end 59 of the rod will accordingly enter or be withdrawn from the socket in the member 60. The relation between the threads 59 and those on the sleeve 57 is such that the rod 58 and the pin 54 will be maintained in the same longitudinal relation at all times. The extent of movement of the knockout pin and the knockout rod will always be the same but the points between which this movement takes place may be varied to suit the particular requirements. It will be apparent that by appropriately adjusting the field of movement of the punch, by means of hand-wheel 47, and simultaneously adjusting the upper and lower limits of movement of the pin 54, by means of hand-wheel 88, the length of the neck formed on the tube may be suitably varied. Thus to produce a relatively long neck the block 22 will be lowered and the sleeve 57 will be correspondingly lowered.

*Tube removal*

Suitable means are provided for removing the extruded tube from the punch after the tube has been formed. For this purpose gas under pressure is passed through the punch into the tube to blow it off. It is for this reason that it becomes quite desirable that the end of the tube should be imperforate. Obviously, if the punch operated to completely puncture the end of the tube neck, it would not be possible to efficiently remove the tube by simple gas pressure. Even should sufficient air be used to overcome the leakage which might occur at the end of the tube, when perforated, there would be a certain lack of uniformity in the removal of the tube. It is important in the high speed operations contemplated by the present invention that the tube should be removed in the same brief time interval at all times. This result is accomplished by the present construction.

Referring now particularly to Figures 2, 4, 5 and 11, a gas line 90 is provided from any suitable gas pressure source. An elbow 91 serves to connect the line 90 with a flexible hose 92 which at its opposite end is connected with an opening into one of the trunnions 29 of the punch holder. A passage 93 is provided through the trunnion to substantially the center of the punch holder. This passage is in communication with a similar passage 94 through the center of the punch. At its lower end the passage 94 is flared outwardly as indicated at 95 (Figure 11), and is normally closed by a valve 96. The stem of this valve is slotted or grooved, as at 97, to provide a shoulder cooperating with a pin 98 to limit the outward movement of the valve. As shown, the end portion 99 of the punch is preferably made separable from the main body of the punch so that it may be formed of harder material, more readily suited to the punching operation. The detachable end has a shank adapted to enter a recess in the main body of the punch and is adapted to be held in position by means of a set-screw 100.

A valve 101 is also provided in the gas line 90 for controlling the discharge of gas into the tube. The stem 102 of this valve is adapted to be engaged by a set-screw 103 carried by a member 104 secured to the face of the head 26. This engagement causes the valve to be opened whenever the head is in its upper position. At this time, the valve 96 being also open, gas will be blown through the punch to remove the tube. Valve 96 will have been opened upon the initial upward movement of the punch, during the preceding cycle of operation, as illustrated in Figure 15. The nose of the punch at the end of the valve will be frictionally held by the metal of the tube, which is wedged tightly between this nose and the wall of the die. This friction is greater than that between the sides of the tube and the main surface of the punch. Therefore, as the punch starts its upward movement, the tube will remain in the die and the valve 96 will stick in the tube. This serves not only to open the valve 96 but also to loosen the tube upon the punch proper so as to prepare it for the subsequent blowing operation. This initial upward movement of the punch also causes a slight separation between the lower end of the valve and the closed end of the tube, as shown in Figures 15 and 16, so that air will be admitted into the neck of the tube. If the friction between the tube neck and the die is not great enough for this purpose, it may readily be increased to any extent desired by providing small ridges in the side wall of the die into which a portion of the metal of the neck may be extruded to an infinitesimal extent. As will be later pointed out, the knockout pin 54 is operated after the slight movement mentioned between the tube and the punch so as to positively force the tube out of the die and cause it to follow along with the punch, during the remaining upward movement of the latter.

Figure 4:
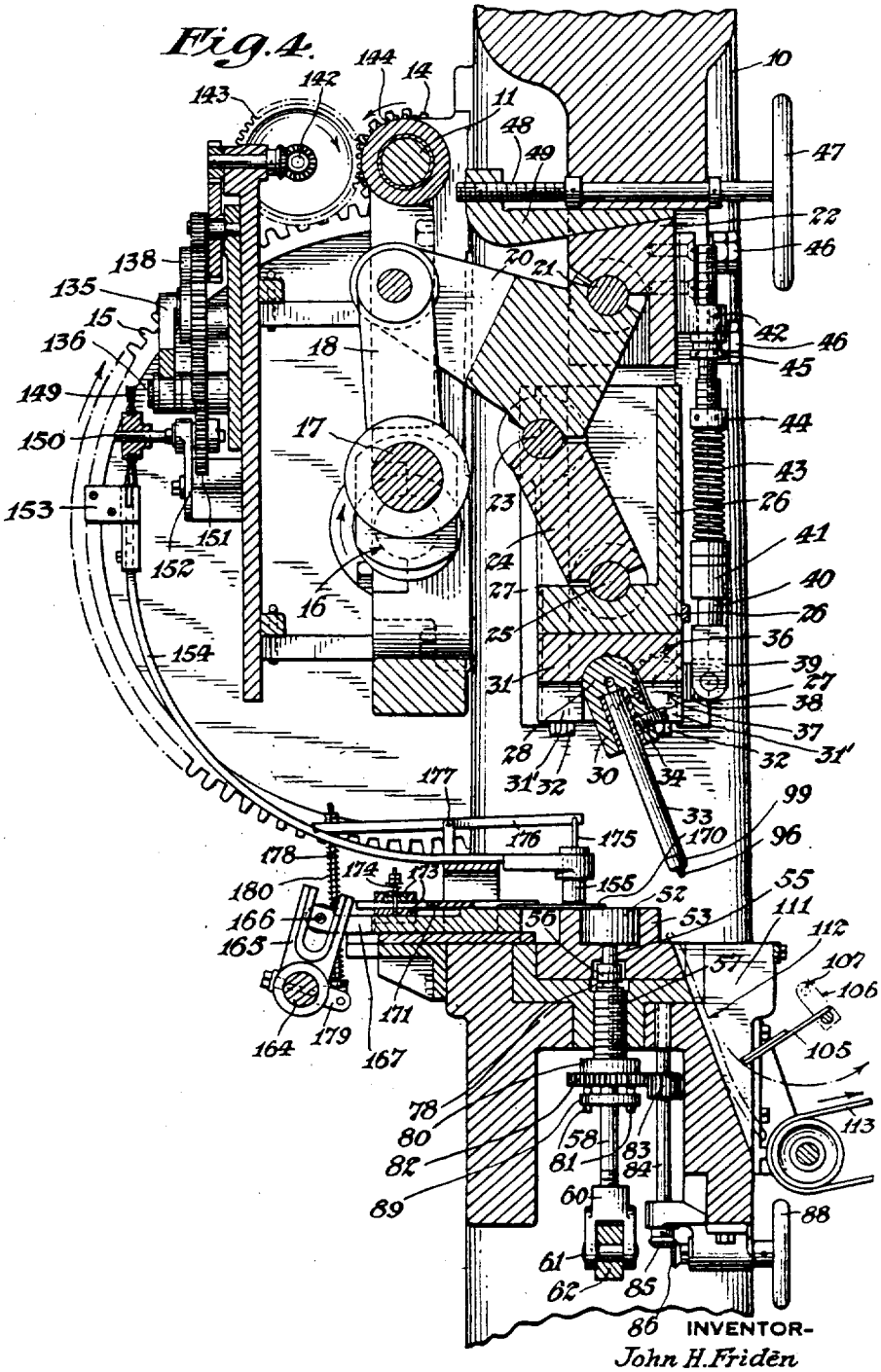
Figure 4 is a central vertical section through the machine taken along the line 4—4 of Figure 2.
Figure 5:
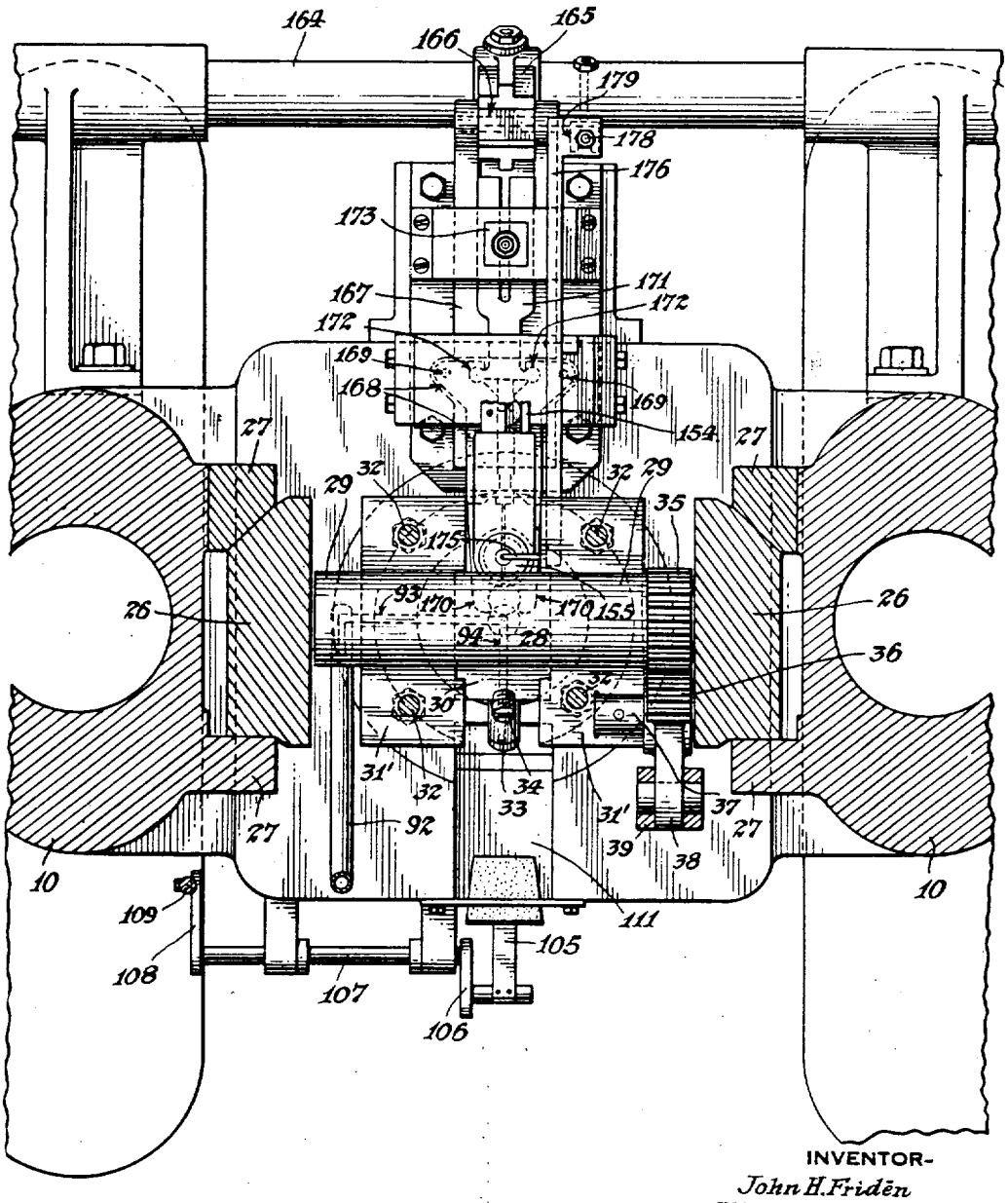
Figure 5 is a horizontal section through the machine taken along the line 5—5 of Figure 2.

The tubes produced by the process of extrusion will ordinarily have relatively thin walls and will, therefore, be quite fragile. It is accordingly necessary to provide suitable means for preventing destruction of the tube as it is blown from the punch. For this purpose a target or arm 105 carrying a padded surface is placed in the path of the tube. This target may, for example, be covered with a sheet of felt, leather, rubber, or other soft material. It is carried by an arm 106 secured to a shaft 107. This shaft, as will be explained, is rocked in synchronism with the movement of the tube, as it is blown from the punch, so that when the tube strikes the target, the latter will be receding and the force of the blow will consequently be very materially reduced. For the purpose of rocking the shaft 107 at the appropriate time, an arm 108 is connected to its outer end and this in turn supports, at its free end, a vertically extending rod 109. The upper end of this rod is reduced and is passed through an opening in the bar 104. The reduced portion of the rod is screw-threaded to receive a pair of adjustable nuts 110 which rest upon the upper surface of the bar 104. These nuts may be adjusted to appropriately time the movement of the target 105. It will be apparent that normally the head 26, when in its upper position, will hold the target 105 in the position indicated in Figure 4. However, when the head 26 moves downwardly, the weight of the rod 109 and of the target will cause the latter to swing counter-clockwise (Figure 4). This counter-clockwise movement will take place just as the tube extruded during the preceding operation of the machine is blown toward the target. The blow with which the tube strikes the target will be broken to a considerable extent in this way. When the tube is blown from the punch, it enters a channel 111 cut into the frame of the machine. To further avoid danger of injury to the tube, the inclined surface of the channel 111 may be covered by a pad 112 of any suitable material. As the tube strikes the target 105, the two will travel together through a small arc and the tube will then be deposited upon a travelling conveyor 113. This conveyor may be driven in any suitable way. As shown in Figure 1, it may be driven from the shaft 16 by means of chains 114 and 115 and a series of suitably located sprockets.

*Hopper and slug feeding mechanism*

Means are provided for automatically feeding a slug into the die upon each cycle of operation of the machine. The mechanism employed for this purpose is entirely automatic and is so constructed and operated as to assure the presence of a slug upon each downward movement of the punch after the machine has once been placed into operation. The slug feeding devices are best shown in Figures 3 to 9 inclusive. A hopper 116 is provided to receive a suitable supply of slugs capable of taking care of the requirements of the machine over a considerable period. Associated with this hopper is an auxiliary hopper or container 117 into which the slugs are fed, from the main hopper. A gate 118, which may be adjusted to provide an opening of any suitable size, controls the flow of the slugs by gravity from the main hopper to the auxiliary container. The appropriate adjustment of the gate will depend to a certain extent upon the size of the slugs being used. The bottom of the main hopper is inclined at an angle of about 30° to the horizontal so that the slugs will descend in suitable numbers into the container 117. If desired, a portion 119 of the bottom of the union hopper may be pivotally connected, as at 120, to provide a discharge opening through which the contents of the hopper may be quickly removed when occasion requires, as when a change is to be made in the size of tube produced. This pivoted section is preferably directly in line with the gate 118 and auxiliary container 117 and it is held in closed position by means of a latch plate 121 pivotally fastened to the bottom of the hopper by a bolt 122. The bottom of the auxiliary hopper is also inclined at about 30° and is adapted to discharge the slugs into a narrow, vertically extending passage 123. A curved surface 124 of rather large radius is provided between the bottom of the auxiliary receptacle and the outer wall of the passage 123 to insure easy sliding of the slugs into the vertical passage. Within this passage there is mounted a slide 125 which extends completely across the passage and is adapted to be shifted from the position shown in Figure 7 to that shown in Figures 6 and 8. The rear portion of the upper edge of the slide is extended a slight distance above the forward portion of this edge, as indicated at 126, and the upper edge of this extension is preferably rounded in the manner shown. This arrangement is such that the slugs in dropping into the passage 123 will fall between the extension 126 and the inner vertical wall 127 of the auxiliary hopper 117 and passage 123. This serves to retain at the upper end of the slide 125 one or more slugs in a row which may have fallen into the passage 123. Therefore, as the slide is elevated, these slugs will be carried up to the position shown in Figure 8.

Suitable means may be provided to retain and guide the slide in its vertical, reciprocating movements, which are imparted in the manner now to be explained. The slide is formed with a downward extension 128 which is adapted to be connected with a vertically extending rod 129. The connection for this purpose comprises a split collar 130 surrounding the rod and adapted to be clamped thereto by a screw 131. A stud 132 which passes through an opening in the lower end of the extension 128 is received by a recess in the member 130. The stud 132 preferably has an enlarged head 133 by which it may be readily grasped and removed. When in position within the member 130 it may be held against accidental removal by means of a transversely extending pin 134 which fits into aligned, complementary grooves in the stud 132 and in the member 130. By this arrangement the slide 125 may be very quickly disconnected from the rod 129 should it be necessary or desirable to do so as the result of jamming of the slugs or for any other reason. Reciprocation of the rod 129 is effected in the following manner: A bell crank 135 pivoted at 136 to a suitable portion of the frame carries a roller 137, on one arm, cooperating with a cam 138. The other arm of the bell crank is provided with a cylindrical or rounded end adapted to cooperate with a similarly curved seat in a member 140 carried within a slot or groove in a portion of the rod 129. The member 140 is preferably formed of wear-resisting material and may be suitably retained within the slot in the rod. It will be apparent that upon the rotation of the cam 138, the bell crank 135 will be rocked and will cause a corresponding reciprocation of the rod 129. If desired, a spring may be provided to hold the roller 137 against the cam. However the weight of the rod and connected parts will generally be sufficient for this purpose so that a spring will normally not be required. Cam 138 is rotated by suitable connections from the shaft 11. These connections include gearing 141 between the cam and a shaft 142, while the outer end of this shaft carries a gear 143 adapted to mesh with a gear 144 secured to the shaft 11. By the provision of the main and auxiliary hoppers, in the manner explained, it is possible to maintain a large supply of slugs to be fed automatically into the machine and at the same time provide for a relatively short stroke of the slide 125 to elevate a series of slugs from the bottom to the top of the hopper. In the arrangement shown, the stroke of the slide may be limited to 4 or 5 inches. On the other hand if the slide were placed directly within the main hopper, of satisfactory size, it would be necessary to give it a stroke of between one and two feet. This reduction in the stroke not only saves time, which is itself a great economy, but also cuts down on the amount of work required to reciprocate the slide.

At the upper end of the wall 127 of the auxiliary container there is pivotally mounted an inclined plate 145 which extends over the upper end of the slide 125. This pivoted plate is urged by a spring 146 into the position shown in Figure 6. It will be apparent that if one or more slugs should be carried upwardly above the row of slugs indicated in Figure 8, these extra slugs will be cammed back into the auxiliary receptacle by means of the plate 145. In order that this plate will not interfere with free access into the auxiliary container from above at times when the machine is at rest, and to assist in dislodging slugs which may become caught, provision is made for rocking or tilting the plate back from the dotted line position to the full line position shown in Figure 7 and subsequently permitting the plate to be restored by the spring 146. For this purpose an arm 147 is secured to the plate and is adapted to be engaged by the lower of a pair of guides 148 on the rod 129 retaining the member 140. As this rod reaches the lower end of its travel, the projection 148 engages the arm and rocks the plate into the full line position shown in Figure 7. To further prevent one or more slugs from being carried up above those slugs properly positioned on the plate 125, and to prevent any such slugs from being accidentally thrown out of the auxiliary receptacle, a rotating brush 149 is provided above the lower corner of the plate 145. This brush is mounted upon a shaft 150 which is constantly rotated by a connection from the shaft 11 comprising a gear 151 meshing with the train of gearing 141. The brush is carried by a bracket 152 having an elongated slot by which it may be adjustably mounted upon the frame.

Figure 8:
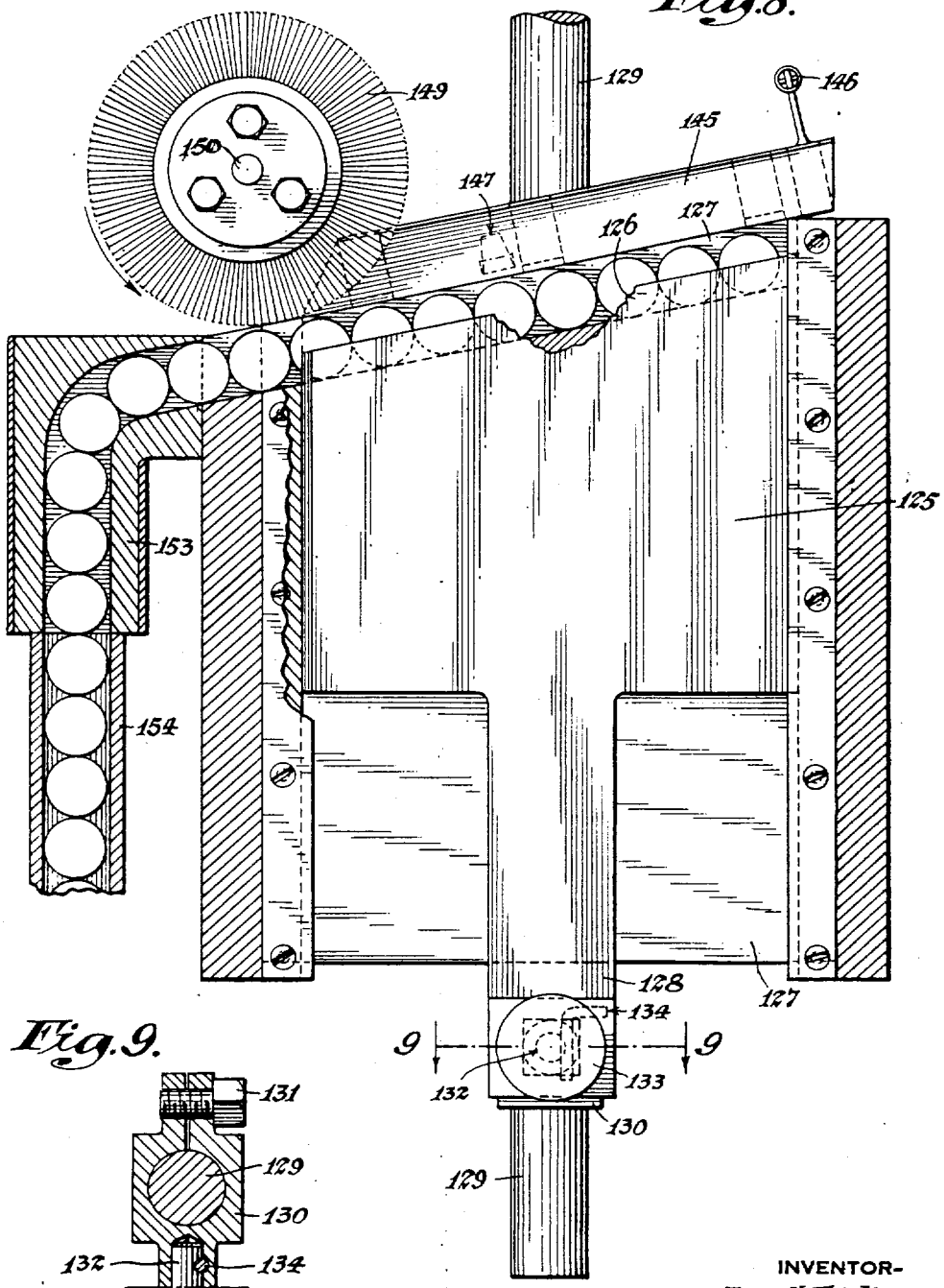
Figure 8 is an enlarged vertical section along the line 8—8 of Figure 6 showing a detail of the construction.
Figure 9:
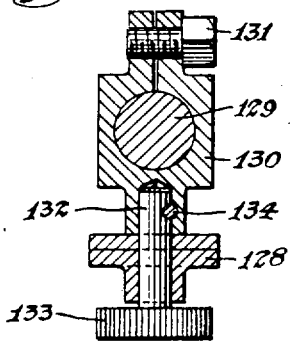
Figure 9 is a horizontal section along the line 9—9 of Figure 8.

It will be apparent from an inspection of Figure 8 that upon each upward movement of the slide 125 as many as eight slugs may be properly caught behind the extension 126 and carried into a position in which they will roll freely into an elbow 153. Upon some reciprocations of the slide, it may be that none of the slugs will be properly caught and hence none will be brought into proper position for discharge into the elbow 153. On other operations any number of slugs, between 1 and 8, may be properly lifted, depending upon the way in which they happen to fall in the auxiliary receptacle. It will be found that by the provision for a maximum of eight slugs, an ample supply will be discharged into the elbow 153 to take care of the requirements of the machine. In the machine illustrated the gearing is such that the operations of the slide 125 are less frequent than the cycles of the punch. Obviously this relation may be varied to suit the operating conditions and to insure an ample supply of the slugs at the die. If more slugs are carried up than can be led away through the elbow 153, they will simply be retained on the slide 125 and will reciprocate with the latter until ample room is provided in the elbow 153 and the associated delivery tube 154. This tube, as best shown in Figure 4, is curved through an arc of about 90 degrees and serves to deliver the slugs in horizontal position into a cylindrical holder 155. This holder is adapted to retain a small number of slugs, approximately 10.

From the bottom of the stack of slugs within the cylinder 155, each is fed successively into the recess in the die. The feeding mechanism provided for this purpose is operated by suitable connections from the shaft 16. An eccentric pin 156 carried by a disc secured to the shaft 16 is received by a strap 157. This strap is connected by an extensible link or rod 158 with a smaller strap 159 carried by a stud 160. This stud is preferably adjustably carried within a recess 161 in a frame 162. For this purpose the stud may have screw threaded engagement with a bolt 163 carried by the frame. Frame 162 is suitably clamped to a rock shaft 164 journalled on the main frame of the machine and carrying a forked member 165 at about its mid point. This forked member cooperates with a block pivoted on a pin 166 carried by a slide 167 disposed horizontally in a plane just below the bottom of the container 155. A pair of dogs 168 pivoted at 169 upon the slide is provided with complemental jaws 170 adapted to be brought together to substantially surround a slug and retain the latter, and adapted later to be spread apart to release the slug. The clamping and releasing movements of the jaws are automatically brought about by the provision of a frictional drag in the following manner: A slide 171 is provided with extensions 172 fitting into sockets formed in the dogs 168. Friction members 173 engage the upper and lower surfaces of the slide 171 and the parts are preferably forced together by means of a spring 174 whose tension may be suitably adjusted. It is apparent that as the slide 167 is shifted from the top of Figure 5 toward the bottom, the frictional drag produced by the slide 171 will cause the dogs 168 to rock upon their pivots 169 until the jaws 170 grip the slug which is dropped from the bottom of the container 155. As the slide 167 continues to shift, it will then carry the slug from the position beneath the container to a position directly above the opening in the die, and it will also act to hold the remaining slugs in holder 155. Now, upon the return movement of the slide 167, the frictional drag will again be effective but this time in the opposite direction to open the jaws. This will permit the slug to drop into the opening in the die while the dogs will be returned to their initial position ready to receive the next slug.

In order to prevent sticking of the slugs in the container 155, and to insure a quick delivery of a new slug into the space between the jaws 170 as they reach their initial position special means is provided. This comprises a finger 175 adapted to reciprocate vertically in the container. This finger is carried by one arm of a lever 176 pivoted at 177, and having its other arm connected by a rod 178 with an arm 179 extending from the shaft 164. A spring 180 surrounding the rod 178 is held under compression between a shoulder pivotally associated with the arm 179 and the under surface of the lever 176. As the shaft 164 is rocked to shift the slide 167 toward the right (Figure 4), the finger 175 will be elevated to permit another slug to be fed from the chute 154 into the container 155. As the shaft 164 is rocked in the opposite direction, however, to return the slide 167 and jaws 170 to the position to receive another slug, the finger 175 will be depressed under the force of the spring 180 and will accordingly quickly force the lowermost slug from the container as the opening in the jaws is brought beneath the container.

*Summary of operation*

The operation of the machine as a whole may now be briefly described. Let it be assumed that the hopper 116 is filled with slugs of suitable diameter and thickness to produce a tube of a given size. The gate 118 will be adjusted to provide for the proper flow of the slugs into the auxiliary container 117. Necessary adjustment should be made of all of the adjustable features of the machine to adapt it for the particular extrusion job in hand. Wheel 47, for example, may be turned to vary the upper and lower limits of the movement of the punch head and thus determine the extent to which the punch enters the die. Handwheel 88 may be similarly turned to adjust the upper and lower limits of throw of the knock-out rod 58 and to position the shoulder at the top of sleeve 57 according to the length of the neck desired at the end of the tube. Various other adjustments may be made if necessary.

The machine may now be set into operation. Power will be transmitted to the pulley 12 and will cause the shaft 11 to be rotated by direct connection and the shaft 16 to be rotated through the gearing 14, 15. If no slugs were previously in position to be fed the first operation or two will simply be idle insofar as extrusion is concerned. The slide 125, however, will be reciprocated in the auxiliary container, by means of the cam 138 through connections 141, 142, 143 and 144 from the shaft 11, and a group of slugs, depending upon how many have fallen in proper relation to the top of the slide, will be carried into the position of Figure 8 and discharged into the passage or chute 154. If desired the slide 125 may be recip·ocated once upon each cycle of operation of the punch, although it will normally be found to keep the chute 154 well supplied by a fewer number of operations than are given to the punch. On each cycle of operation of the shaft 15 the slide 167 (Figures 1, 4 and 5) will be reciprocated, by means of the eccentric 156 and connections to the rock shaft 164, so that a slug will be carried from beneath the container 155 to the center of the die and will be deposited in the latter.

Figure 18:
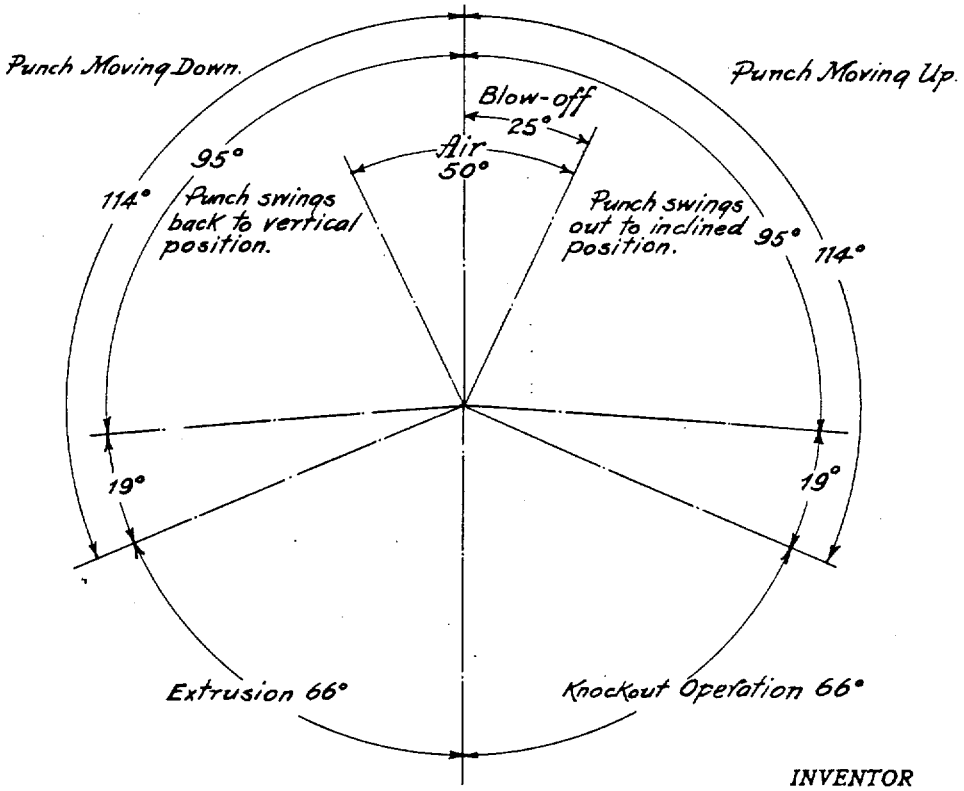
Figure 18 is a diagram indicating the timing of various functions performed during a cycle of operation.

Upon each rotation of the shaft 16 the head 26 will be reciprocated in its vertical guides by means of the eccentric portion 17 of the shaft and the toggle formed by the members 20 and 24. During the initial downward movement of the head the punch holder 28 will be rocked from the position shown in Figure 4 to a strictly vertical position. This movement, as shown in Figure 18, occupies approximately 95° of the rotation of shaft 16. During the next 19° of rotation of this shaft the punch moves down into engagement with the slug, as shown in Figure 12. Extrusion now begins to take place and is continued for the next 66° of the cycle. As the punch enters further into the die, at this stage of the operation, the knockout pin 54 is permitted to recede yieldingly with the punch, against the action of spring 75, until the shoulder 78 on the rod 56 engages the upper end of the sleeve 57. This recession of the knockout pin is controlled by the pair of cams 73 and 74 and the connections therefrom, including arms 69 and 70, rod 66, lever 62 and knockout rod 58. The cam 73 is cut away over an arc of from 45° to 60° in the particular layout illustrated, so as to permit the spring 75 alone to yieldingly resist the downward movement of the punch. The cams 73 and 74, it will be understood, are not fully complemental. Cam 73 is only slightly cut away over the sector indicated so that should the spring fail for any reason, the cam would then positively control a gradual recession of the pin. By the yielding recession of the pin 54 in this way the puncturing of the end of the tube is prevented.

Upon completion of the extrusion, the punch is in the position shown in Figure 14 and the crank portion 17 of the shaft 16 passes through the bottom of its travel. As the punch now starts to rise the point of the valve 96 will stick in the die and will hold the tube so that a slight slippage will take place between the tube and the body of the punch. This will serve to open the valve 96 and, also, loosen the tube on the punch and provide a slight gap between the end of the valve and the closed end of the tube. By this time the slight clearance between the rods 56 and 58 will have been taken up and the knockout pin 54 will then follow the upward movement of the punch, thus forcing the tube out of the die. It will be understood that the cam 74 will be provided with a receding surface, for this purpose, while the cam 73 is provided with a rise to assist the spring 75 with a positive action. This operation occupies approximately the first 66° of the upward movement of crank 17 in the particular machine illustrated. The punch then continues to rise to clear the die during about the next 19° of the cycle. At this time collar 45 will be brought against the bracket 42 so that further upward movement of rod 40 is prevented. Upon the continued upward movement of the head 26 the punch holder will then be rocked back to the initial, angled position of Figure 4, this movement occupying about 95° of the cycle. As the head 26 approaches its upper limit, the bar 104 will engage the stem 102 of the valve 101 (Figure 2) to admit gas into the punch holder and punch. Valve 96 will still be open at this time and hence the gas will blow the tube from the punch. This discharge of gas continues for about 25° of the cycle on each side of the upper dead center of the eccentric. As the tube is blown from the punch it is forced against the padded arm 105 but this, at the time it is struck, will be receding by virtue of the fact that the bar 104 on head 26 will be moving down on its next cycle and will withdraw its support from the rod 109. The force of the blow will in this way be materially lessened.

The extruded tube will be deposited on the conveyor 113 and carried to the next stage in the production of the finished article. It will be understood that the same cycle will be repeated over and over again, so long as the machine remains in operation.

While an illustrative machine, embodying the various features of the invention, has been disclosed in considerable detail, it will be understood that numerous changes may be made in the construction and inter-relation of the various parts without departing from the general principles and scope of the invention as defined by the claims. It will be understood that the particular timing of the various operations indicated in Figure 18 relates to the specific machine illustrated assuming a definite extrusion stroke. The timing will vary slightly as the extrusion stroke, or length of tube to be extruded, or other factors affecting the operation of the machine are varied. If desired, the rod 40 and related mechanism may be duplicated at the opposite side of the machine to balance the mechanism.

I claim:

1. In an extrusion press an operating shaft, a die holder, a reciprocating head, a punch carried by said head, connections from said operating shaft to said head for reciprocating the same, and means for rocking the punch into and out of die registering position by changing the angle of its axis upon reciprocation of the head.

2. In an extrusion press an operating shaft, a die holder, a reciprocating head, a punch pivotally mounted upon said head, and means for rocking said punch upon its pivot into and out of die registering position by changing the angle of its axis and for reciprocating the head to carry said punch into and out of the die.

3. In an extrusion press an operating shaft, a die holder, a reciprocating head, a punch pivotally mounted upon said head about an axis at an angle to the axis of said punch, means for rocking said punch upon its pivot into and out of die registering position and for reciprocating the head to carry said punch into and out of the die, and means for removing an extruded member from said punch as it is rocked out of die registering position.

4. In an extrusion press an operating shaft, a die holder, a die having a shiftable bottom in said holder, a reciprocating head, a punch pivotally mounted upon said head, means for rocking said punch upon its pivot into and out of die registering position and for reciprocating the head to carry said punch into and out of the die, cam controlled means for shifting the bottom of said die in synchronism with the movement of the punch into and out of the same to provide a constant but receding support for the material during extrusion and to assist in the removal of an extruded member from the die, and means for removing an extruded member from said punch as it is rocked out of die registering position.

5. In an extrusion press a holder for a die, a punch, means for moving the punch into the die to extrude a tubular member, means for forcing said member off of the punch, a target against which said member is thrown when forced from the punch, and means for shifting said target in synchronism with and in the direction of the movement of said member as it is thrown.

6. A method of extruding tubes with imperforate ends which comprises forcing a punch against a blank in a die to form an extruded member, partly withdrawing the punch independently of the extruded member for a sufficient distance to loosen the grip of the member on the punch, then causing a portion of the bottom of the die to follow the punch, and subsequently blowing a gaseous medium through the punch to remove the extruded member.

7. A method of extruding tubes with imperforate ends which comprises forcing a punch against a blank in a die, partly withdrawing the punch while the extruded member is held in the die, then causing the punch and member to move in unison, and subsequently blowing the member from the punch.

8. In an extrusion press a die holder for retaining a die, a punch adapted to enter the die, means for reciprocating the punch, means for reciprocating a portion of the bottom of the die during operation of the punch, and means for varying the upper and lower limits of movement of the punch and said portion of the die bottom.

9. In an extrusion press a die holder for retaining a die, a reciprocating head, a punch rockably carried by said head, means adjacent said head having a limited movement relative to said head and a movement with the head, and connections from said means for rocking said punch during one of said movements.

10. In an extrusion press a die holder for retaining a die, a reciprocating head, a punch rockably carried by said head, means adjacent said head having a limited movement relative to said head and a movement with the head, connections from said means for rocking said punch during one of said movements, and means for simultaneously varying the ranges of said movements.

11. In an extrusion press a frame member, a reciprocating head, a punch pivotally carried by said head, a toggle between said frame and head, means for straightening and breaking said toggle to reciprocate said head, and means on said head for rocking said punch during a portion of the reciprocation of said head.

12. In an extrusion press a die having a portion of its bottom adapted to reciprocate, movable means for shifting said portion, a stop for limiting movement of said portion in one direction, and means for simultaneously adjusting said stop and varying the limits of movement of said movable means at will.

13. In an extrusion press a die, a punch, means for moving said punch longitudinally relative to said die, said die having a portion in line with said punch adapted to move therewith, means including a movable member and a fixed stop for determining the position of said portion, and a single means for controlling said last mentioned means to vary the upper and lower limits of movement of said portion.

14. In a device of the class described main and auxiliary hoppers for retaining discs to be fed, the auxiliary hopper being arranged to receive discs by gravity from the main hopper, a slide adapted to be reciprocated adjacent a wall of the auxiliary hopper, said slide being carried from a point below the bottom of said hopper to a point adjacent its top, the slide retaining a variable number of discs vertically disposed upon each reciprocation, means for receiving the retained discs from said slide as it reaches the upper limit of its travel and means cooperating with said slide for removing a second tier of discs from said slide.

15. In a device of the class described a hopper for retaining articles to be fed, means for retaining a limited number of said articles in a single column, means for feeding said articles from said hopper to said retaining means, a reciprocatory slide beneath said retaining means, means including a reciprocatory plunger for supplying a single article at a time from said retaining means to said slide, a main operating mechanism, connections from said mechanism for reciprocating said slide to advance each article to a position to be acted upon, and a device operated by said connections for operating said plunger.

16. In a device of the class described a hopper for retaining articles to be fed, means for retaining a limited number of said articles in a single column, means for feeding said articles from said hopper to said retaining means, a reciprocatory slide beneath said retaining means, means for supplying a single article at a time from said retaining means to said slide, means for reciprocating said slide to advance each article to a position to be acted upon, said slide having jaws adapted to grasp the article and release it, and friction means for opening and closing said jaws automatically upon movement of the slide in opposite directions.

17. In a device of the class described a main hopper, an auxiliary hopper in communication with said main hopper, said hoppers having inclined bottoms, the one forming a continuation of the other, whereby articles are fed by gravity from the main hopper to the auxiliary hopper, a vertically disposed slide adjacent one wall of the auxiliary hopper, means for reciprocating said slide to carry its upper surface from a point below the bottom of said auxiliary hopper to a point adjacent its top, the bottom of said hopper being joined by a rounded surface with the wall of a recess in which said slide is reciprocated, said slide retaining a variable number of articles upon successive reciprocations and discharging them from the hopper.

18. In an extrusion press an operating shaft, a reciprocatory head, a punch mounted upon said head, means operated by said shaft for reciprocating said head and punch, a die holder, a die in said holder having a recess adapted to receive and hold a disc of extrudable material in line with the reciprocatory movement of said punch, said punch having a projection of relatively small cross-sectional area at its free end, said die having a portion of its bottom in line with said projection shiftable toward and away from said punch, cam controlled means for shifting said portion of the bottom of said die, said means holding said portion in engagement with the disc being extruded from the time of contact of said projection therewith but causing said portion to recede as the punch advances and thereby prevent perforation of the disc in the course of extrusion.

19. In an extrusion press an operating shaft, a reciprocatory head, a punch mounted upon said head, means operated by said shaft for reciprocating said head and punch, a die holder, a die in said holder having a recess adapted to receive and hold a disc of extruded material in line with the reciprocatory movement of said punch, said punch having a projection of relatively small cross-sectional area at its free end, said die having a portion of its bottom in line with said projection shiftable toward and away from said punch, cam controlled means for shifting said portion of the bottom of said die, said means holding said portion in engagement with the disc being extruded from the time of contact of said projection therewith but causing said portion to recede as the punch advances and thereby prevent perforation of the disc in the course of extrusion, and means for varying at will the range of movement of said portion of the die bottom.

20. In an extrusion press a die holder, an operating shaft, a reciprocatory head, toggle mechanism for operating said head, connections from said shaft for actuating said toggle mechanism, a punch holder rockably mounted on said head and adapted to tilt a punch retained thereby into and out of die registering position, and means for automatically rocking said holder upon the reciprocation of said head.

21. In an extrusion press a main frame, a die holder carried by said frame, a reciprocatory head mounted in said frame, an operating shaft, toggle members connected between a portion of said frame and said head, connections from said shaft for actuating said toggle members, a punch holder rockably mounted on said head and adapted to tilt a punch retained thereby into and out of die registering position, and connections between said punch holder and said portion of said frame for rocking said holder to tilt a punch into and out of die registering position upon the actuation of said toggle members.

22. In an extrusion press a main frame, a die holder carried by said frame, a reciprocatory head mounted in said frame, an operating shaft, toggle members connected between a portion of said frame and said head, connections from said shaft for actuating said toggle members, a punch holder rockably mounted on said head and adapted to tilt a punch retained thereby into and out of die registering position, and yieldable connections between said punch holder and said portion of said frame for rocking said holder to tilt a punch into and out of die registering position upon the actuation of said toggle members.

23. In an extrusion press a main frame, a die holder carried by said frame, a reciprocatory head mounted in said frame, an operating shaft, toggle members connected between a portion of said frame and said head, connections from said shaft for actuating said toggle members, a punch holder rockably mounted on said head and adapted to tilt a punch retained thereby into and out of die registering position, and yieldable connections between said punch holder and said main frame for causing said punch holder to rock during a portion of the travel of the head to tilt a punch into and out of die registering position.

24. In an extrusion press a die holder, an operating shaft, a reciprocatory head, toggle mechanism for operating said head, connections from said shaft including a continuously rotating crank for actuating said toggle mechanism, a punch holder rockably mounted on said head and adapted to tilt a punch retained thereby into and out of die registering position, and means for automatically rocking said holder upon the reciprocation of said head.

25. In an extrusion press a main frame, a die holder carried by said frame, a reciprocatory head mounted on said frame, a punch holder rockably mounted on said head and adapted to tilt a punch retained thereby into and out of die registering position, an operating shaft, connections from said shaft for reciprocating said head once upon each revolution of the shaft, and means for automatically rocking said punch holder to tilt the punch into and out of die registering position as the head is reciprocated, the construction and arrangement being such that the punch is maintained in die registering position for nearly half of each revolution of said shaft.

26. In an extrusion press a main frame, a die holder carried by said frame, a reciprocatory head mounted on said frame, a punch holder rockably mounted on said head and adapted to tilt a punch retained thereby into and out of die registering position, an operating shaft, connections from said shaft for reciprocating said head once upon each revolution of the shaft, and means for automatically rocking said punch holder to tilt the punch into and out of die registering position as the head is reciprocated, the construction and arrangement being such that at least 45 degrees of a cycle of operation of said shaft is effective for extrusion purposes.

27. In an extrusion press a die holder, an operating shaft, a reciprocatory head, toggle mechanism for operating said head, connections from said shaft for actuating said toggle mechanism, a punch holder rockably mounted on said head and adapted to tilt a punch retained thereby into and out of die registering position, and means for automatically rocking said holder upon the reciprocation of said head, the construction and arrangement being such that at least 45 degrees of a cycle of operation of said shaft is effective for extrusion purposes.

28. In an extrusion press a main frame, a die holder carried by said frame, a reciprocatory head mounted on said frame, a punch holder rockably mounted on said head and adapted to tilt a punch retained thereby into and out of die registering position, an operating shaft, connections from said shaft for reciprocating said head once upon each revolution of the shaft, and means for automatically rocking said punch holder to tilt the punch into and out of die registering position as the head is reciprocated, the construction and arrangement being such that at least one-third of the period of movement of the punch in one direction is effective for extrusion purposes.

29. In an extrusion press a main frame, a die holder carried by said frame, a head mounted for reciprocation on said head, a punch holder rockably mounted on said head and adapted to tilt a punch retained thereby into and out of die registering position, pivotally connected toggle members having the free end of one member connected with said head and the free end of the other member connected with said frame, an operating shaft, connections from said shaft for operating said toggle members to reciprocate said head, means for adjusting the position of said head relative to said frame for any given point in the cycle of operation of said shaft, and connections between said punch holder and said frame for rocking said holder upon the actuation of said toggle members.

30. In an extrusion press a main frame, a die holder carried by said frame, a head mounted for reciprocation on said head, a punch holder rockably mounted on said head and adapted to tilt a punch retained thereby into and out of die registering position, a block adjustably mounted on said frame, pivotally connected toggle members having the free end of one member connected with said head and the free end of the other member connected with said adjustably mounted block, an operating shaft, connections from said shaft for operating said toggle members to reciprocate said head, means for adjusting the position of said head relative to said frame for any given point in the cycle of operation of said shaft, and connections between said punch holder and said adjustably mounted block for rocking said holder upon the actuation of said toggle members.

JOHN H. FRIDÉN.